(12) United States Patent
Ljolje

(10) Patent No.: US 12,340,793 B1
(45) Date of Patent: Jun. 24, 2025

(54) AUGMENTING VOICE SAMPLES BASED ON DISTRIBUTIONS OF SPEAKER CLASSES

(71) Applicant: Interactions LLC, Franklin, MA (US)

(72) Inventor: Andrej Ljolje, Bernardsville, NJ (US)

(73) Assignee: Interactions LLC, Franklin, MA (US)

( * ) Notice: Subject to any disclaimer, the term of this patent is extended or adjusted under 35 U.S.C. 154(b) by 115 days.

(21) Appl. No.: 17/851,902

(22) Filed: Jun. 28, 2022

(51) Int. Cl.
| | |
|---|---|
| *G10L 15/08* | (2006.01) |
| *G10L 15/06* | (2013.01) |
| *G10L 15/07* | (2013.01) |
| *G10L 21/007* | (2013.01) |
| *G10L 25/18* | (2013.01) |
| *G10L 25/75* | (2013.01) |
| G10L 15/065 | (2013.01) |
| G10L 15/10 | (2006.01) |
| G10L 15/12 | (2006.01) |

(52) U.S. Cl.
CPC ............ *G10L 15/063* (2013.01); *G10L 15/07* (2013.01); *G10L 21/007* (2013.01); *G10L 25/18* (2013.01); *G10L 25/75* (2013.01); *G10L 15/065* (2013.01); *G10L 15/08* (2013.01); *G10L 15/10* (2013.01); *G10L 15/12* (2013.01)

(58) Field of Classification Search
None
See application file for complete search history.

(56) References Cited

U.S. PATENT DOCUMENTS

| | | | | |
|---|---|---|---|---|
| 5,930,753 A * | 7/1999 | Potamianos | .......... | G10L 15/065 |
| | | | | 704/E15.013 |
| 6,236,963 B1 * | 5/2001 | Naito | ...................... | G10L 15/07 |
| | | | | 704/256.2 |
| 6,292,775 B1 * | 9/2001 | Holmes | ................... | G10L 15/10 |
| | | | | 704/256.1 |
| 7,567,903 B1 * | 7/2009 | Goffin | ..................... | G10L 15/12 |
| | | | | 704/250 |
| 8,010,358 B2 * | 8/2011 | Chen | ....................... | G10L 15/32 |
| | | | | 704/250 |
| 9,165,555 B2 * | 10/2015 | Goffin | ..................... | G10L 15/10 |
| 10,360,901 B2 * | 7/2019 | Sainath | .................. | G10L 15/16 |
| 11,961,522 B2 * | 4/2024 | Kim | ........................ | G10L 25/21 |

(Continued)

OTHER PUBLICATIONS

Kamm, T. et al., "Vocal Tract Normalization in Speech Recognition: Compensating for Systematic Speaker Variability," The Journal of the Acoustical Society of America, vol. 97, Issue 5, Jun. 1995, pp. 175-178.

(Continued)

*Primary Examiner* — Richard Z Zhu
(74) *Attorney, Agent, or Firm* — Fenwick & West LLP

(57) ABSTRACT

A method of augmenting a training dataset of voice samples is provided. An audio processing system obtains voice samples and groups the voice samples into classes of spectral representations. The system obtains warp distributions associated with the classes of spectral representations and determines spectral change ratios based on a comparison of the warp distributions. The system determines transformations based at least in part on the spectral change ratios and applies the transformations to the voice samples grouped into the classes of spectral representations to generate a set of augmented voice samples. The system compiles the training dataset using at least the set of augmented voice samples. A recognition model is trained using the training dataset.

20 Claims, 5 Drawing Sheets

(56) References Cited

U.S. PATENT DOCUMENTS

2021/0043186 A1\* 2/2021 Nagano ................. G10L 15/063
2021/0319786 A1\* 10/2021 Kain ...................... G09B 19/04

OTHER PUBLICATIONS

Ljolje, A. et al., "Low Latency Real-Time Vocal Tract Length Normalization," International Conference on Text, Speech and Dialogue: 7th International Conference, TSD 2004, Brno, Czech Republic, Sep. 8-11, 2004, pp. 371-378.

\* cited by examiner

AUGMENTING VOICE SAMPLES BASED ON DISTRIBUTIONS OF SPEAKER CLASSES

FIELD OF ART

This disclosure relates generally to the fields of acoustic modeling and speech recognition, and more specifically, to augmenting human speech data for training a recognition model.

BACKGROUND

When building acoustic models for speech recognition, to increase the amount of data and cover more voices, data may be augmented. The benefits of data augmentation include higher recognition accuracy, lower implementation costs, and faster deployment. It is important for augmentation methods to be practical and to create data that is representative of scenarios that will occur at runtime. Improper augmentations can result in turning female voice samples into unrealistically squeaky voices and turning male voice samples into unrealistically rumbly, troll-like voices. The resulting model that is trained from such unrealistic samples may perform poorly. For example, the model may confuse vowels or be unable to properly distinguish between similar-sounding consonants, such as for the "f," "s," and "sh" sounds.

SUMMARY

A training data set may include a set of voice samples, such as male and female speakers reading a transcript or speaking a sentence. To increase the number of samples in the set, augmented versions of the voice samples may be generated. To generate augmentations that are sensible and realistic, and thus leading to better model performance, the data is split into spectra for deeper and higher-voiced speakers (e.g., male and female respectively), and gaussian distributions of each class of spectra (or their parameterized representations) can be used as the basis for determining transformations that can create higher-voiced versions of deep-voiced speakers and deeper-voiced versions of high-voiced speakers. In particular, the distribution of spectral warps for each class of speaker is used to derive a spectral change that can change a voice sample in one group to resemble a typical or close to average voice sample in another group.

A method of augmenting a training dataset of voice samples is provided and described herein. In one embodiment, the method comprises obtaining a plurality of voice samples and grouping the voice samples into classes of spectral representations. Warp distributions associated with the classes of spectral representations are obtained and compared to one another to determine spectral change ratios. The spectral change ratios are used to determine transformations for augmenting voice samples from one class into the spectral representation of another class. The transformations are applied to the voice samples to generate a set of augmented voice samples, which are compiled into the training data set used to train a recognition model.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION OF THE INVENTION

Figure 1:
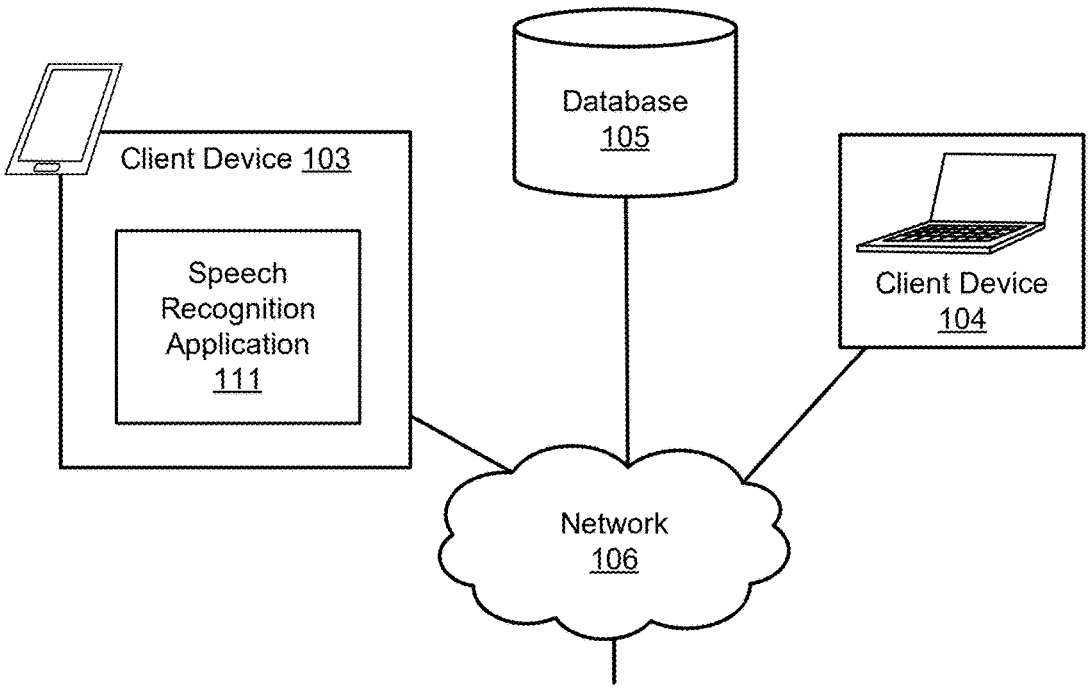
FIG. 1 is a networking diagram illustrating a communication environment in which an audio processing system operates, according to some embodiments.
Figure 1:
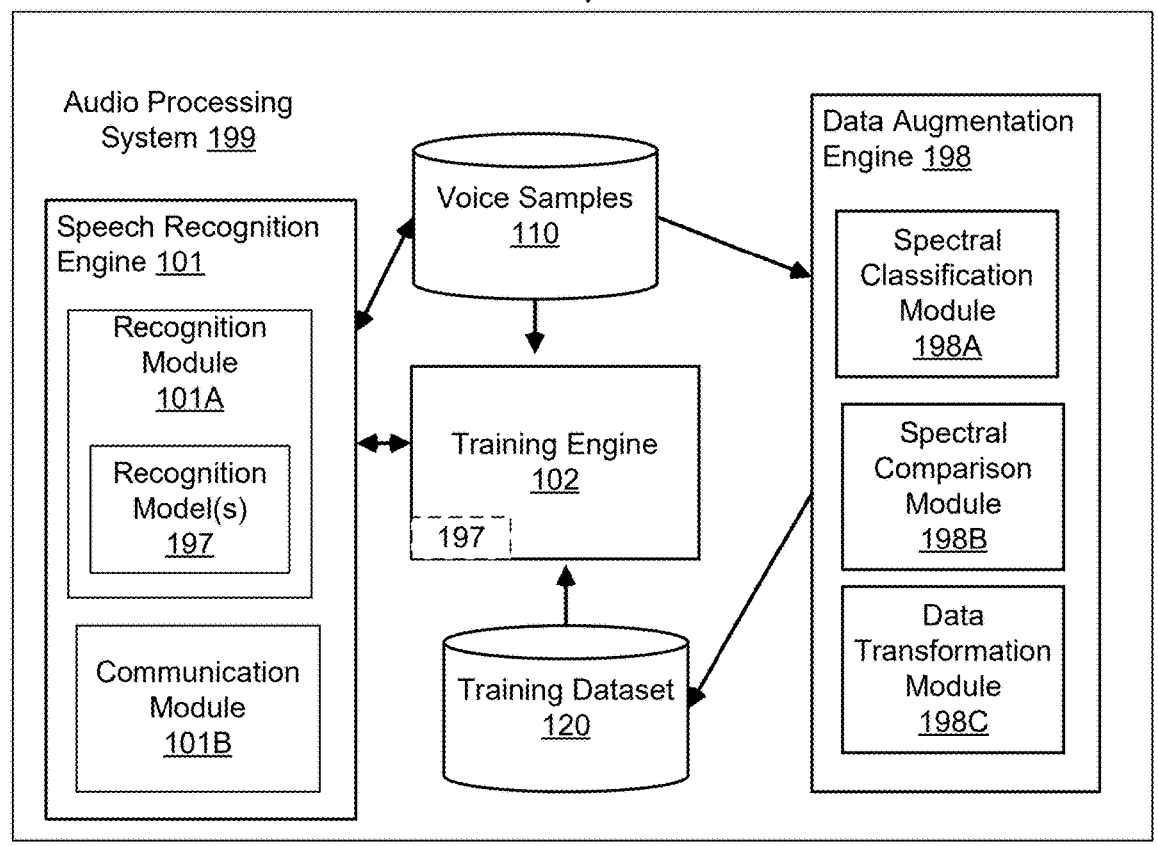

FIG. 1 is a networking diagram illustrating a communication environment 100 in which an audio processing system 199 operates, according to some embodiments. The communication environment 100 includes the audio processing system 199, client devices 103 and 104, a speech recognition application 111, a database 105, and a network 160. In alternative configurations, different, fewer, and/or additional components may be included in the communication environment 100.

Audio processing system 199 processes audio files. The audio files may include media files containing voice recordings. Additionally, the media files may include text data associated with the voice recordings. The audio processing system 199 may be configured to recognize speech contained in the voice recordings (e.g., human speech), and may further convert the speech into text for one or more languages. The audio processing system 199 is further configured to collect voice samples 110, augment the voice samples, generate/compile training dataset(s) 120 from the voice samples, and to train/build a recognition model 197 using the training dataset 120. To perform these functions, the audio processing system 199 comprises a speech recognition engine 101, training engine 102, and data augmentation engine 198. For ease of describing the invention, speech recognition engine 101, training engine 102, and data augmentation engine 198 are shown as integrated into a single system, audio processing system 199; however, in some embodiments, they may each be separate and distinct systems (e.g., separate and remote servers). In embodiments, audio processing system 199 may comprise one or more computing devices that include the components of the machine depicted in FIG. 4.

Speech recognition engine 101 provides a speech recognition service. For example, audio data received from client device 103 through network 106 may be processed and translated into text for human speech. In embodiments, the client device 103 may establish a connection to speech recognition engine via speech recognition application 111, which may provide functionality for obtaining audio data through the client device 103 (e.g., retrieving from memory or obtaining through an audio input device of the client device 103) and sending to audio processing system 199. The speech recognition engine 101 can be used as a component of a larger natural language processing environment, such as a component of a server providing virtual agent (VA)

services to client devices 103 and 104 over a wide-area computer network, such as the Internet. While the audio processing system 199 may be executed as a remote server, similar systems may also be executed locally at client devices 103 and 104. For example, the speech recognition application 111 may locally execute the functions of speech recognition engine 101. The speech recognition engine 101 comprises a communication module 101B and a recognition module 101A.

Communication module 101B sends, receives, formats, and reformats data messages. The data messages may be requests and responses for processing audio data, such as for speech recognition. For example, a user of client devices 103 or 104 can send a request including audio data, and the communication module 101B can package and send a response containing text associated with the audio data (e.g., human speech that is recognized and translated to text). The data messages may include audio data, text data, image data, or some combination thereof. Furthermore, the data message may include identifying information for the client device 103, 104, and/or users thereof.

Recognition module 101A applies audio data to one or more recognition model(s) 197 to recognize speech from the audio. The recognition model(s) 197 may comprise one or more acoustic models used in automatic speech recognition. The recognition model(s) 197 map the relationship between an audio signal and phonemes or other linguistic units that make up speech recorded in the audio signal. The recognition model(s) 197 are generated from a set of audio recordings (e.g., voice samples 110) and their corresponding transcripts. In embodiments, the recognition model(s) 197 may comprise a machine learning model. For example, the machine learning model may be trained on previous samples of audio and a transcription of the audio samples in order to predict the transcription of new audio that is later received and requested for speech recognition. In embodiments, the recognition model(s) 197 may be trained using a training engine 102. In one embodiment, the recognition model 197 may be a recurrent neural network. In one embodiment, the recognition model 197 may be a long short-term memory (LSTM) model.

Training engine 102 builds a trained model using a training dataset 120. In embodiments, the training dataset 120 may be compiled from voice samples 110 and augmentations thereof. For example, the training engine 102 executes a learning algorithm (e.g., supervised, unsupervised, semi-supervised, reinforcement learning, etc.), which may provide a mapping of audio data to speech data (e.g., text). As one example, training engine 102 may train a neural network by building LSTM units from batches of audio samples presented in sequence. In one embodiment, the voice samples 110 may include recordings of different voices speaking a transcript (e.g., reading the news out loud or speaking a prepared excerpt). In one embodiment, the voice samples 110 may include audio data from past requests for speech recognition by speech recognition engine 101. In embodiments, a set of augmented voice samples that are compiled into training dataset 120 may be generated using data augmentation engine 198. The training dataset 120 may comprises training examples containing training data, including the voice samples 110, the set of augmented voice samples, and corresponding transcripts for the voice samples 110 and for the set of augmented voice samples. Training engine 102 builds recognition model 197 by mapping relationships between audio data and linguistic units contained in the training examples.

Data augmentation engine 198 augments voice samples 110 to generate a set of augmented voice samples. In one embodiment, data augmentation engine 198 further compiles the set of augmented voice samples into training dataset 120 for training recognition model(s) 197 trained by training engine 102 and deployed by speech recognition engine 101. For example, the data augmentation engine 198 may enlarge the training dataset 120 including voice samples 110 by adding augmented versions of the voice samples 110 that it generates. In embodiments, data augmentation engine 198 may implement a method of augmenting a training dataset of voice samples, such as the method described with respect to the description of FIG. 3 further below. To perform the method, data augmentation engine 198 comprises a spectral classification module 198A, spectral comparison module 198B, and data transformation module 198C.

Spectral classification module 198A groups voice samples into classes of spectral representations. As used herein, a "spectral representation" may refer to a mapping of a spectrum of frequencies of a signal as it varies with time. For example, as a recorded speaker speaks a set of words, the spectrum of frequencies produced by the speaker's voice and the amplitude of the recorded voice signal at each frequency can be recorded over time (e.g., at 10 ms time intervals), and the spectral representation may comprise the complete mapping of amplitude to frequency over the entire duration of the recording. As one example, a spectral representation of a voice sample can be represented visually using a spectrogram. A "class of spectral representation" may refer to a particular classification or grouping of spectral representations. In one embodiment, classes of spectral representations may relate to a classification of speaker type, where speaker types having similar vocal tract lengths may further have similar spectral representations when speaking the same phrases over a period of time, and thus may belong to the same class. For example, individuals with longer or larger vocal tracts may have larger cavities (i.e., pharyngeal cavities) for producing sound thereby lowering the frequencies of resonances in those cavities (e.g., lower formants when speaking vowels), leading to generally deeper voices and lower fundamental frequencies when speaking certain phonetical sounds, words, or phrases. Conversely, individuals with shorter or smaller vocal tracts may have smaller cavities for producing sound, thereby raising the frequencies of resonances in those cavities (e.g., higher formants when speaking vowels), leading to generally higher voices and higher fundamental frequencies when speaking certain phonetical sounds, words, or phrases. In embodiments, the classes of spectral representations may correspond to a variety of speaker types having varying vocal tract lengths relative to one another, such as male speakers, female speakers, child speakers, among others. In some embodiments, the speaker types may include subtypes, such as male (high end, small male), male (average), male (low end, large male), female (high end, small female), female (average), female (low end, large female), androgenous, child (young age, small child), child (average), child (older age, larger child), etc. In one embodiment, the speaker types may include bass, tenor, alto, soprano, and the like. In one embodiment, spectral classification module 198A may group voice samples 110 into classes of spectral representations by identifying speaker type labels associated with each of the voice samples. For examples, data augmentation engine 198 may obtain voice samples 110 that are labeled according to gender, age, size of speaker, etc. In one embodiment, spectral classification module 198A may group voice samples 110 into classes of spectral representation using a detection model, such as described, referenced, and incorporated in: T. Kamm, G. Andreou and J. Cohen, "Vocal Tract Normalization in Speech Recognition: Compensating for Systematic Speaker Variability", In {it Proc. of the 15th Annual Speech Research Symposium}, pp. 161-167, CLSP, Johns Hopkins University, Baltimore, MD, June 1995.

Spectral comparison module 198B determines spectral change ratios based on a comparison of warp distributions. Spectral comparison module 198B is configured to obtain, determine, or calculate warp distributions associated with each class of spectral representations used for grouping of voice samples 110 by spectral classification module 198A. As used herein a "warp value" may refer to a value indicating the spectral difference between a particular voice sample and a normalized voice sample. For example, a warp value may be the spectral difference or "warp" between a voice of a particular person having a particular vocal tract length and the voice of an average or median vocal tract length across a set of samples. As one example, a set of male, female, and child speakers may speak a transcript of words and phrases, and the normalized voice sample for the set of samples may be a hypothetical voice sample of an androgenous, average-aged speaker speaking the transcript. In one embodiment, spectral comparison 198B may obtain warp distributions for each class of spectral representations by determining a warp value for each voice sample 110 and plotting the warp values of each class as a gaussian distribution. The "peak warp value" may refer to the most frequently occurring warp value for a given class of spectral representations (e.g., the highest point on a histogram of the warp values for the class or the center of a gaussian distribution of the warp values for the class). For example, a peak warp value for a class of male speaker types may be centered at 1.1, with warp values within one standard deviation of the peak warp value sitting between 1.06 and 1.14. In one embodiment, the spectral comparison module 198B may determine the peak warp values associated with each class of spectral representation by applying the voice samples of each class into a trained acoustic model. For example, an acoustic model may be trained to receive a group of voice samples and estimate a peak warp value for the group of samples. In one embodiment, the trained acoustic model may be a vocal tract length normalization (VTLN) acoustic model, such as described, referenced, and incorporated in: "Low Latency Real-Time Vocal Tract Length Normalization", by Andrej Ljolje, Vincent Goffin and Murat Saraclar, *Proceedings: Text, Speech and Dialogue, 7th International Conference, TSD* 2004, Brno, Czech Republic, September 2004. In embodiments, the peak warp value associated with a particular class of spectral representations may be identified as the target for transforming other voice samples into the particular class. For example, the peak warp value for male voice samples can be the target for augmenting female and child voice samples. As such, the difference in peak warp values for each class of spectral representations may be used to determine spectral differences (i.e., spectral change ratios) between speaker types (e.g., between male, female, and child voices). In one example, when plotting or determining a warp distribution for male voices, the peak warp value may be 1.1, while plotting for female voice the peak warp value may be 0.9. This may indicate about a 20% spectral difference between male (1.1) and female (0.9) voices, and thus a spectral change ratio of 20% compression for the spectral representations of male voice samples and 20% expansion for the spectral representations of female voice samples.

In one embodiment, spectral comparison module 198B may further use the warp values for each voice sample to generate warp distributions for more specific classes of spectral representations (e.g., relating to speaker sub-types). For example, warp distributions may be generated for small male speaker types, large female speaker types, small speaker types, large children speaker types, which may have peak warp values of 1.05, 1.2, 1.25, and 1.35 respectively. Spectral comparison module 198B may compare the peak warp values across each warp distribution to determine spectral change ratios for transforming each speaker sub-type to another sub-type (e.g., large male speaker into any sized female speaker). In one embodiment, spectral comparison module 198B may determine spectral change ratios by randomly selecting a value from a predetermined range of spectral change values. For example, the range of warp values amongst a set of warp distributions may vary from 0.8 to 1.2, and the predetermined range of spectral change values may include any percentage value from a 0 to +/−40% change. Further details regarding determining spectral change ratios based on a comparison of the warp distributions are described with respect to FIG. 2 further below.

Data transformation module 198C determines and applies transformations to data to generate augmented data samples. In embodiments, data transformation module 198C applies a particular data transformation to voice samples grouped into a given class of spectral representations. For example, taking a set of voice samples grouped into a male speaker class of representations, a transformation may be applied across the spectral representations for the set of voice samples in order to augment them into spectral representations that fit the distribution for a female speaker class. In embodiments, data transformation module 198C may determine the transformations based on spectral change ratios determined by spectral comparison module 198B. Each spectral change ratio determines the change in frequency for shifting a warp distribution of a particular class of spectral representations to the center/peak of another class of spectral representations (e.g., shifting male to female, female to male, male to child, child to male, female to child, child to female, etc.). By applying a spectral change ratio derived from a comparison of peak warp values between the distributions of two classes, data transformation module 198C generates a set of augmented voice samples mapping one class of representations to another (i.e., creating a new set of voice samples that fits a typical distribution for the speaker type that is targeted). In one embodiment, data transformation module 198C further changes the tempo of the voice samples as part of the data transformation. In another embodiment, to add additional variance to the set of augmented voice samples, random noise or other random spectral changes may be added or incorporated into the transformations. Additional details regarding applying transformations to voice samples grouped into different classes of spectral representations are provided with respect to the description of FIG. 5, further below.

The client devices 103 and 104 are computing devices capable of receiving user input as well as transmitting and/or receiving data via a network (e.g., network 106). The client devices 103 and 104 may be computer systems, such as a desktop or a laptop computer, or the client devices 103 and 104 may be devices having computer functionality, such as a smartphone, tablet, gaming system, smart TV, or another suitable device. The client devices 103 and 104 may be configured to communicate with the audio processing system 199 via network 106, for example, using a native application executed by the client device 103 or 104 or through an application programming interface (API) running on a native operating system of the client device 103 and 104, such as IOS® or ANDROID™. For example, the client device 103 may use a native application for the virtual agent system and operate the speech recognition engine 101 locally on processors of the client device 103 (e.g., offline from the network 106). In another example, the client device 104 may use a healthcare application that interfaces with a virtual agent system and the speech recognition engine 101 (e.g., through an API of the audio processing system 199) to provide speech-assisted services (e.g., a user with poor eyesight may use the virtual agent to request that their prescriptions be refilled). Either client device 103 or 104 may be a computing device that includes the components of the machine depicted in FIG. 4.

The database 105 stores data. In one embodiment, the data may be historical data. The historical data may include data relating to the client devices 103 and 104 and/or users thereof. In some embodiments, the database 105 may be a third-party database. In one embodiment, database 105 may be coupled to or accessed by audio processing system 199. In one embodiment, voice samples 110 may be retrieved from database 105.

The network 106 may serve to communicatively couple the client devices 103 and 104, the database 105, and the audio processing system 199. In some embodiments, the network 106 includes any combination of local area and/or wide area networks, using wired and/or wireless communication systems. The network 106 may use standard communications technologies and/or protocols. For example, the network 106 includes communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 106 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 106 may be represented using any suitable format, such as hypertext markup language (HTML) or extensible markup language (XML). In some embodiments, all or some of the communication links of the network 106 may be encrypted using any suitable technique or techniques.

Figure 2:
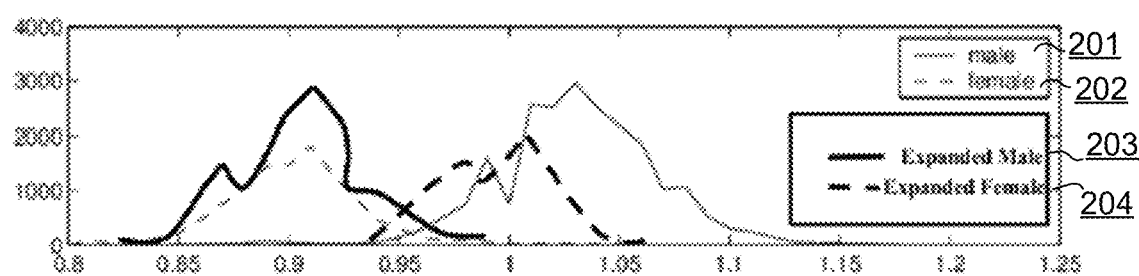
FIG. 2 is a conceptual illustration of determining spectral change ratios based on a comparison of the warp distributions.

FIG. 2 is a conceptual illustration of determining spectral change ratios based on a comparison of the warp distributions. Warp distributions 201, 202, 203, and 204 are shown plotted, with warp values on the X-axis and the number of occurrences on the Y-axis. In a natural distribution of spectral warps of voices (i.e., warp distribution), there may be two peaks, one at 0.9 and the other at 1.1, with extreme ranges at 0.8 and 1.2. In embodiments, the peaks of warp distribution 201 and warp distribution 202 may be dependent on the particular algorithm used for computing the warps (e.g., VTLN), and furthermore, as more samples are collected, the peaks of the warp distributions 201 may shift (e.g., away from the 0.9 and 1.1.). In embodiments, the difference between the peaks of warp distribution 201 and warp distribution 202 determines the spectral change ratio. As shown, the difference between warp distribution 201 and 202 is (1.1-0.9), and therefore, the spectral change ratios derived from this comparison may include a 20% compression and 20% expansion. For example, warp distribution 201 may be compressed by just under 20% to shift the warp distribution from 1.1 to 0.9 (as shown by warp distribution 203), and the warp distribution 202 may be expanded by just over 20% to center it at 1.1 (as shown by warp distribution 204).

In embodiments, voice samples are split into groups (e.g., high/low, female/male), such as by referencing gaussian distributions of spectra for female and male speech (or their parametrized representations) or by using a VTLN-trained acoustic model. In one embodiment, the location of peaks of the warp distribution 201 and 202 may be estimated using a VTLN-trained acoustic model that is trained on the voice sample data that is to be augmented. The spectral change ratio is determined based on a ratio of the location of the peaks of the warp distributions 201 and 202. As an example, voice samples grouped into the class of spectral representations distributed around 0.9 are expanded by approximately 20% to center its associated warp distribution around 1.1, while voice samples grouped into a class of spectral representations distributed around 1.1 is compressed by approximately 20% to center its associated warp distribution around 0.9. Furthermore, to create additional augmented samples, tempo changes may be randomly applied to some of the samples (e.g., changing the speed of the samples by +/−10%). For example, the transformations from male voice samples to female samples may further include additional transformations into fast speaking female samples, slow speaking female samples, average speed speaking female samples, and so on. The spectral and tempo transformations may be independent and can be matched to achieve desired distributions in the training data that are most suitable for a particular use case, particular voice recognition application, or particular type of acoustic model.

Figure 3:
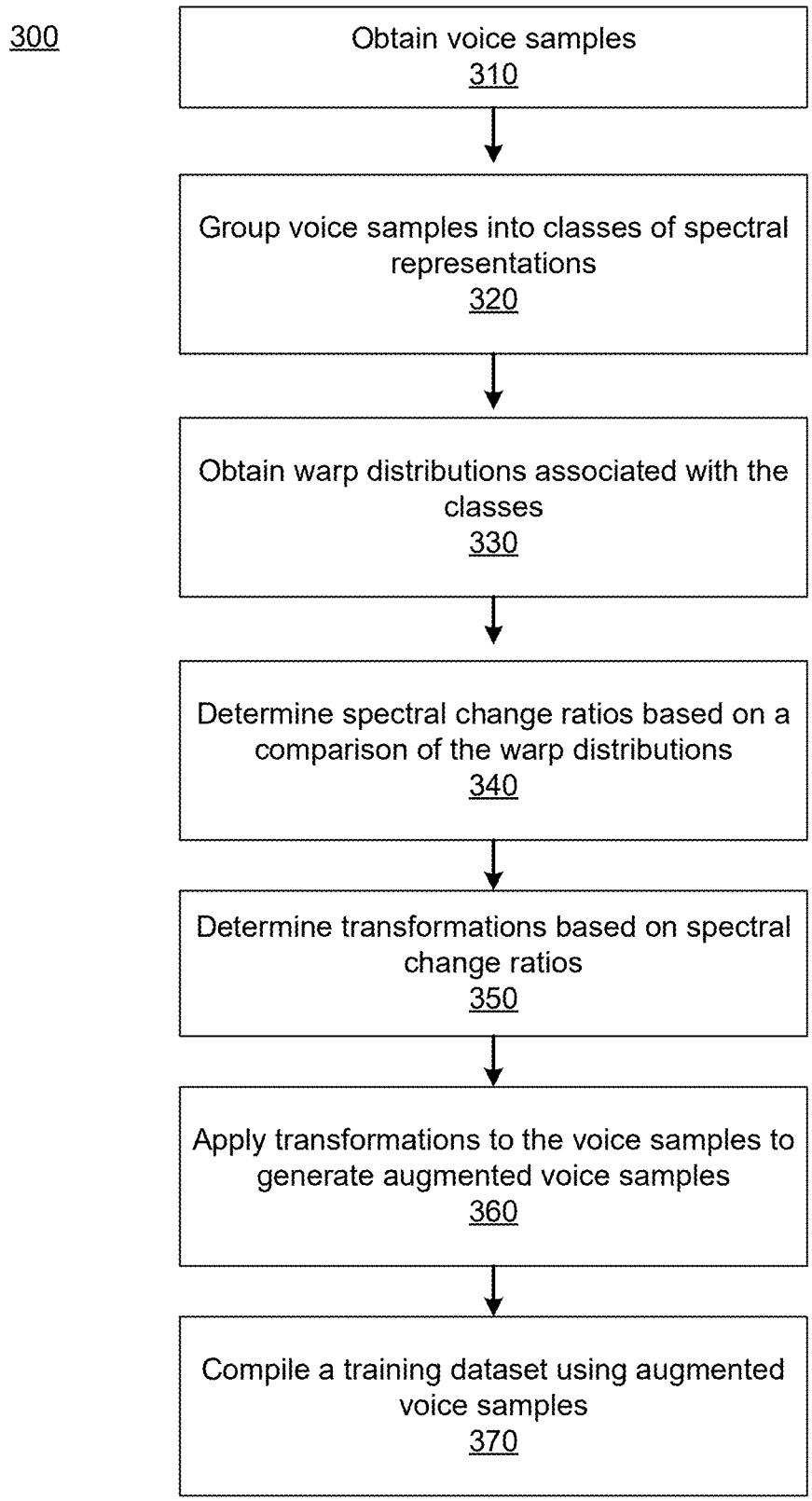
FIG. 3 illustrates a flowchart for a method of augmenting a training dataset of voice samples.

FIG. 3 illustrates a flowchart for a method of augmenting a training dataset of voice samples. Method 300 may be implemented by audio processing system 199. In embodiments, the method 300 may be instructions stored on a non-transitory computer-readable storage medium that, when executed by a processor of the audio processing system 199, cause the processor to perform the steps of method 300.

The system obtains 310 voice samples. For example, audio recordings of different speakers reading a transcript are obtained or retrieved from a database, such as obtaining voice samples 110 or retrieving voice samples from database 105.

The system groups 320 the voice samples into classes of spectral representations. In embodiments, the voice samples may each be classified according to speaker type. The speaker type classifications may include, for example, male, female, and child speakers. Each class of spectral representations may correspond to a group of spectral representations that are similar in terms of estimated vocal tract length of the speaker, such as being representative of a recorded voice sample by a speaker having close to an average male vocal tract length, close to an average female vocal tract length, or close to an average child vocal tract length.

The system obtains 330 warp distributions associated with the classes of spectral representations. For example, the system may determine the warp distributions for each class of spectral representations (male, female, child, etc.) or may retrieve (e.g., from database 105 or from memory) warp distributions associated with typical speakers of each class. As one example, a typical warp distribution for a class of male speakers may have a peak centered around 1.1, while a warp distribution for a class of female speakers may have a peak centered around 0.9. In some embodiments, an acoustic model may be used to determine the warp distributions for each class or estimate a peak warp value for each class based on a set of voice samples that are applied to the acoustic model. As such, the peak warp value for each class of spectral representations may vary depending on the acoustic model that is used to process the voice samples.

The system determines 340 spectral change ratios based on a comparison of the warp distributions. The system may compare the peak warp value of a distribution for a first class of spectral representations (e.g., male speakers) to a second class of spectral representations (e.g., female speakers), and the spectral change ratios for augmenting one class of spectral representations to another is determined to be the difference between the two peak values. For example, the spectral change ratios may comprise a compression factor and a corresponding expansion factor that can be used to shift the frequency spectra of deeper voice samples and higher voice samples respectively.

The system determines 350 determines transformations based on the spectral change ratios determined at step 340. For example, to generate additional variations of the voice samples, spectral change ratios may be applied to the voice samples in each class of spectral representations in a manner that shifts its warp distribution towards the center of the warp distribution associated with another class. As one example, variations may include shifting/compressing the male voice samples by −20% to generate corresponding female voice samples, shifting/expanding the female voice samples by +20% to generate corresponding male voice samples, shifting the child voice samples to generate adult male and adult female versions of the child voice samples, and so on with each of the various groups of voice samples. The transformations may further comprise changes in tempo and random spectral changes to a voice sample.

The system applies 360 the transformations to the voice sample to generate augmented voice samples. For example, the system may be configured to apply the corresponding transformations for each class of spectral representations and generate versions of each voice sample that fit each of the classes (e.g., taking a large male voice sample and creating child-like versions, female versions, smaller male versions etc.). In embodiments, the system may be configured to apply the transformations to some of the voice samples, such as by selecting voice samples at random, by selecting a transformation to apply at random, or some combination thereof.

The system 370 compiles a training dataset using the set of augmented voice samples. For example, the training dataset may include the original voice samples in addition to the various augmented versions of the voice samples (e.g., average male version, average female version, average child version, higher-than average male version, lower-than average male version, higher-than average female version, lower-than average female version, etc.). The training dataset can then be then used to train a speech recognition model.

Figure 4:
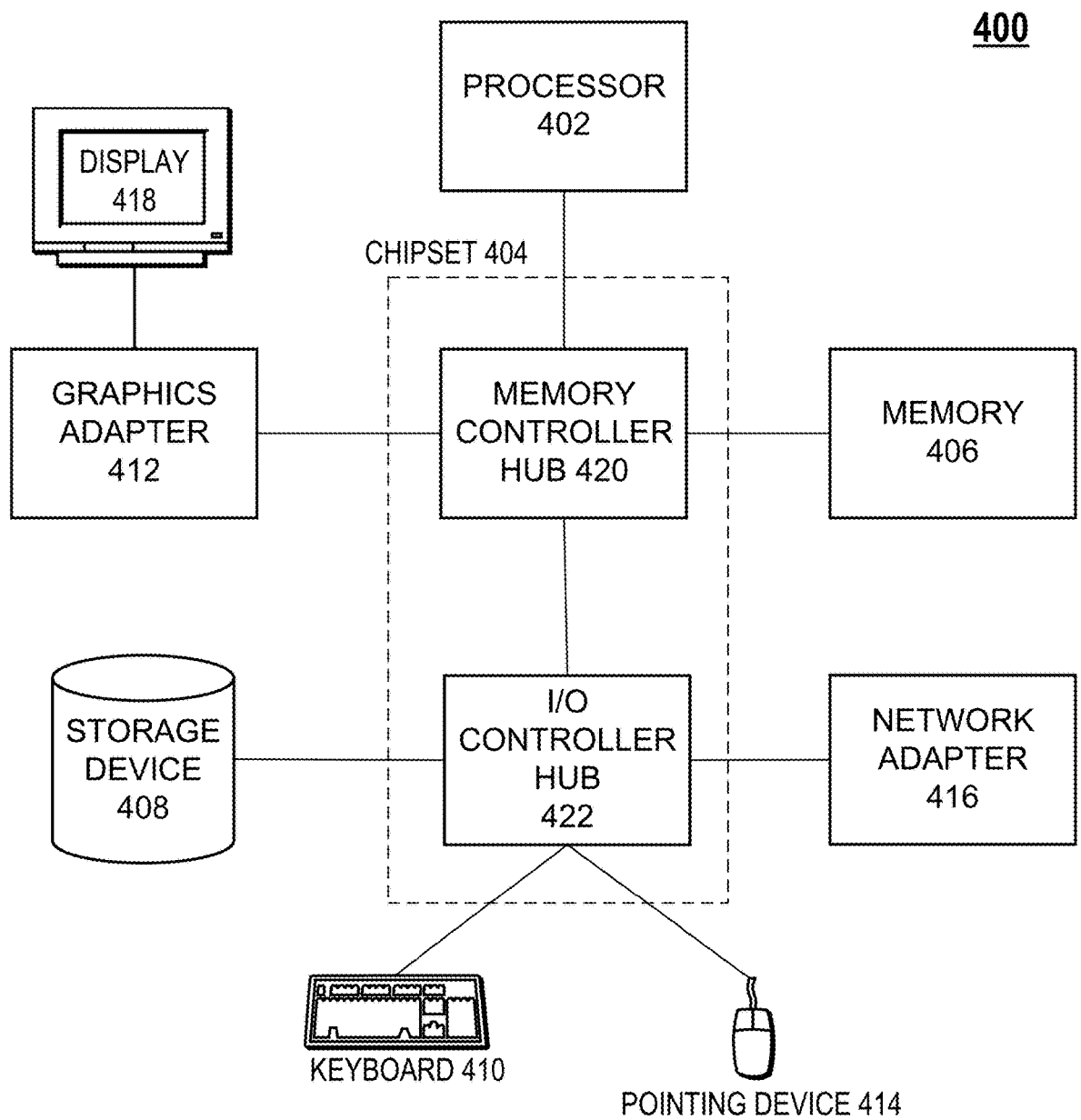
FIG. 4 is a high-level block diagram illustrating physical components of a computer used as part or all of the audio processing system 199 of FIG. 1, according to one embodiment.

FIG. 4 is a high-level block diagram illustrating physical components of a computer 400 used as part or all of the communication environment 100 from FIG. 1, according to one embodiment. Illustrated are at least one processor 402 coupled to a chipset 404. Also coupled to the chipset 404 are a memory 406, a storage device 408, a graphics adapter 412, and a network adapter 416. A display 418 is coupled to the graphics adapter 412. In one embodiment, the functionality of the chipset 404 is provided by a memory controller hub 420 and an I/O controller hub 422. In another embodiment, the memory 406 is coupled directly to the processor 402 instead of the chipset 404.

The storage device 408 is any non-transitory computer-readable storage medium, such as a hard drive, compact disk read-only memory (CD-ROM), DVD, or a solid-state memory device. The memory 406 holds instructions and data used by the processor 402. The graphics adapter 412 displays images and other information on the display 418. The network adapter 416 couples the computer 400 to a local or wide area network.

As is known in the art, a computer 400 can have different and/or other components than those shown in FIG. 4. In addition, the computer 400 can lack certain illustrated components. In one embodiment, a computer 400 acting as a server may lack a graphics adapter 412, and/or display 418, as well as a keyboard or pointing device. Moreover, the storage device 408 can be local and/or remote from the computer 400 (such as embodied within a storage area network (SAN)).

As is known in the art, the computer 400 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 408, loaded into the memory 406, and executed by the processor 402.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Figure 5:
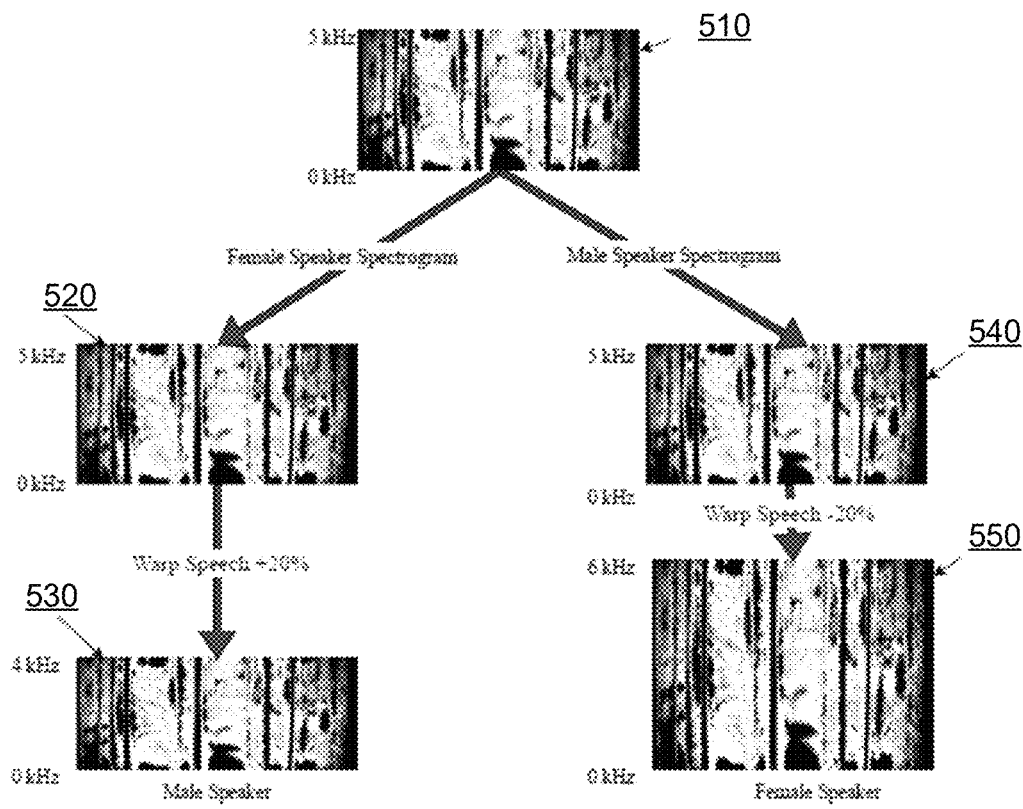
FIG. 5 is a conceptual illustration of applying transformations to voice samples grouped into different classes of spectral representations.

FIG. 5 is a conceptual illustration of applying transformations to voice samples grouped into classes of spectral representations. In illustration 500, spectral representations are visualized as spectrograms. A set of spectral representations 510 are split into a female speaker class 520 of spectral representations and a male speaker class 540 of spectral representations. The female speaker class 520 is expanded by 20%, shifting down the fundamental frequencies captured at each time interval to generate male voice augmentations 530 of the female speaker class 520. The male speaker class 540 is compressed by 20%, shifting up the fundamental frequencies captured at each time interval to generate female voice augmentations 550 of the male speaker class 540. As such, the shape of the corresponding spectrograms for each speaker class (and thus the real-world voice characteristics of their spectral representations) is maintained during the transformations.

The embodiments described herein provide a number of technical advantages. By grouping voice samples into classes of spectral representations, where each class corresponds to speaker types of varying vocal tract length (e.g., male, female, child, etc.), the entirety of voice samples within a given class can be transformed into additional variations, thereby quickly resulting in a larger training dataset for a speech recognition at very little cost. Because the applied transformations are based on a comparison of warp distributions for each class, the resulting set of augmented voice samples are sensible and practical examples that the recognition model can learn from. For example, the methods used herein avoid the negative consequence of spectral changes to female voices into unrealistic, squeaky voices and spectral changes to male voices into unrealistically deep, troll-like voices. Thus, the accuracy of a recognition model is improved when trained on a dataset enlarged with the augmented voice samples that are generated as described. Furthermore, with the vocal tract length (VTL) warp information for the speakers in the training data obtained using the augmentation methods described herein, warp transformations can be created to achieve any distribution of male/female/child, large/average/small, fast/average/slow tempo, or combination thereof, in the combined original and augmentation data to serve any training needs. A range of transformations can be achieved to fit a particular target distribution, which may be different from the original male or female distribution, thus providing greater flexibility over existing augmentation techniques.

OTHER CONSIDERATIONS

One possible embodiment has been described herein. Those of skill in the art will appreciate that other embodiments may likewise be practiced. First, the particular naming of the components and variables, capitalization of terms, the attributes, data structures, or any other programming or structural aspect is not mandatory or significant, and the mechanisms described may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of above description present the inventive features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects described herein include process steps and instructions in the form of an algorithm. It should be noted that the process steps and instructions could be embodied in software, firmware or hardware, and when embodied in software, could be downloaded to reside on and be operated from different platforms used by real time network operating systems.

The concepts described herein also relate to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the concepts described herein are not described with reference to any particular programming language. It is appreciated that a variety of programming languages may be used to implement the teachings as described herein, and any references to specific languages are provided for purposes of enablement and best mode.

The concepts described herein are well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure is intended to be illustrative, but not limiting, of the scope of the concepts described herein, which are set forth in the following claims.

What is claimed is:

1. A method comprising:
   obtaining a plurality of voice samples;
   grouping the plurality of voice samples into at least one class of spectral representations amongst a plurality of classes of spectral representations comprising a first class of spectral representations and a second class of spectral representations;
   obtaining warp distributions associated with the plurality of classes of spectral representations;
   determining one or more spectral change ratios based on a comparison of the warp distributions comprising one or more of,
      determining a first spectral change ratio for centering a warp distribution of the first class around a peak warp value associated with the second class of spectral representations; and
      determining a second spectral change ratio for centering a warp distribution of the second class around a peak warp value associated with the first class of spectral representations;
   determining one or more transformations based at least in part on the one or more spectral change ratios;
   applying the one or more transformations to the plurality of voice samples grouped into the at least one class of spectral representations to generate a set of augmented voice samples;
   compiling a training dataset using at least the set of augmented voice samples;
   training a machine learning model using the training dataset compiled using at least the set of augmented voice samples, wherein the machine learning model is an acoustic model; and
   receiving speech data, applying the machine learning model to map a relationship between the speech data and a plurality of linguistic units, and generating a transcription of the speech data based on the plurality of linguistic units.

2. The method of claim 1, wherein each class of spectral representations in the plurality of classes of spectral representations relates to a classification of speaker type amongst a plurality of speaker types having varying vocal tract lengths.

3. The method of claim 2, wherein the plurality of speaker types having varying vocal tract lengths comprise one or more of: small male, male, large male, small female, female, large female, small child, child, or large child.

4. The method of claim 1, wherein applying the one or more transformations to the voice samples grouped into the at least one class of spectral representations comprises:
applying the first spectral change ratio to voice samples grouped into the first class; and
applying the second spectral change ratio to voice samples grouped into the second class.

5. The method of claim 1, wherein the first class comprises male speaker types, and wherein the second class comprises female speaker types.

6. The method of claim 1, wherein the peak warp value associated with the first class and the peak warp value associated with the second class of spectral representations are estimated using a vocal tract length normalization (VTLN) acoustic model.

7. The method of claim 1, wherein the one or more transformations comprise a tempo change.

8. The method of claim 1, wherein determining one or more spectral change ratios based on a comparison of the warp distributions comprises randomly selecting a spectral change value from a predetermined range of spectral change values.

9. A non-transitory computer-readable storage medium storing instructions that when executed by a processor cause the processor to perform steps comprising:
obtaining a plurality of voice samples;
grouping the plurality of voice samples into at least one class of spectral representations amongst a plurality of classes of spectral representations comprising a first class of spectral representations and a second class of spectral representations;
obtaining warp distributions associated with the plurality of classes of spectral representations;
determining one or more spectral change ratios based on a comparison of the warp distributions comprising one or more of,
determining a first spectral change ratio for centering a warp distribution of the first class around a peak warp value associated with the second class of spectral representations; and
determining a second spectral change ratio for centering a warp distribution of the second class around a peak warp value associated with the first class of spectral representations;
determining one or more transformations based at least in part on the one or more spectral change ratios;
applying the one or more transformations to the plurality of voice samples grouped into the at least one class of spectral representations to generate a set of augmented voice samples;
compiling a training dataset using at least the set of augmented voice samples;
training a machine learning model using the training dataset compiled using at least the set of augmented voice samples, wherein the machine learning model is an acoustic model; and
receiving speech data, applying the machine learning model to map a relationship between the speech data and a plurality of linguistic units, and generating a transcription of the speech data based on the plurality of linguistic units.

10. The non-transitory computer-readable storage medium of claim 9, wherein each class of spectral representations in the plurality of classes of spectral representations relates to a classification of speaker type amongst a plurality of speaker types having varying vocal tract lengths.

11. The non-transitory computer-readable storage medium of claim 10, wherein the plurality of speaker types having varying vocal tract lengths comprise one or more of: small male, male, large male, small female, female, large female, small child, child, or large child.

12. The non-transitory computer-readable storage medium of claim 9, wherein applying the one or more transformations to the voice samples grouped into the at least one class of spectral representations comprises:
applying the first spectral change ratio to voice samples grouped into the first class; and
applying the second spectral change ratio to voice samples grouped into the second class.

13. The non-transitory computer-readable storage medium of claim 9, wherein the first class comprises male speaker types, and wherein the second class comprises female speaker types.

14. The non-transitory computer-readable storage medium of claim 9, wherein the peak warp value associated with the first class and the peak warp value associated with the second class of spectral representations are estimated using a vocal tract length normalization (VTLN) acoustic model.

15. The non-transitory computer-readable storage medium of claim 9, wherein the one or more transformations comprise a tempo change.

16. The non-transitory computer-readable storage medium of claim 9, wherein determining one or more spectral change ratios based on a comparison of the warp distributions comprises randomly selecting a value from a predetermined range of spectral change values.

17. A system comprising:
a processor; and
a non-transitory computer-readable storage medium storing instructions that when executed by the processor cause the processor to perform steps comprising:
receiving, from a client device, a request to recognize speech data;
applying a machine learning model to map a relationship between the speech data and a plurality of linguistic units to generate a transcription of the speech data based on the plurality of linguistic units, wherein the machine learning model is an acoustic model trained using a training dataset compiled from at least a set of augmented voice samples; and
sending a response to the client device, wherein the set of augmented voice samples are generated by:
grouping a plurality of voice samples into a plurality of classes of spectral representations comprising a first class of spectral representations and a second class of spectral representations;
determining spectral change ratios based on a comparison of warp distributions associated with the plurality of classes of spectral representations comprising one or more of,
    determining a first spectral change ratio for centering a warp distribution of the first class around a peak warp value associated with the second class of spectral representations; and
    determining a second spectral change ratio for centering a warp distribution of the second class around a peak warp value associated with the first class of spectral representations;
applying transformations to the plurality of voice samples based at least on the spectral change ratios to generate the set of augmented voice samples; and
compiling the training dataset using at least the set of augmented voice samples.

18. The system of claim 17, wherein the instructions further cause the processor to:
   train the acoustic model using the set of augmented voice samples.

19. The system of claim 17, wherein each class of spectral representations in the plurality of classes of spectral representations relates to a classification of speaker type amongst a plurality of speaker types having varying vocal tract lengths.

20. The system of claim 17, wherein determining spectral change ratios based on a comparison of the warp distributions comprises randomly selecting a value from a predetermined range of spectral change values.

* * * * *